US006529157B1

(12) United States Patent
Mensa et al.

(10) Patent No.: US 6,529,157 B1
(45) Date of Patent: Mar. 4, 2003

(54) RADAR SIGNATURE EVALUATION APPARATUS

(75) Inventors: Dean L. Mensa, Ventura, CA (US); Andre C. Bati, Ventura, CA (US); Kenneth Vaccaro, Camarillo, CA (US); Long D. To, Camarillo, CA (US); Robert E. Dezellem, Port Hueneme, CA (US); David P. Wirtz, Ridgecrest, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 10/071,967

(22) Filed: Feb. 11, 2002

(51) Int. Cl.⁷ ................................................. G01S 7/40
(52) U.S. Cl. .......................... 342/173; 342/89; 342/90; 342/174; 342/175; 342/176; 342/181; 342/195; 342/196
(58) Field of Search ............................. 342/27, 28, 89, 342/90–103, 175–186, 192–197, 21, 22, 26, 165–174

(56) References Cited

U.S. PATENT DOCUMENTS

| 3,842,418 | A |   | 10/1974 | Lorber |  |
|---|---|---|---|---|---|
| 3,976,999 | A | * | 8/1976 | Moore et al. | 342/90 |
| 3,981,008 | A | * | 9/1976 | Mann | 342/90 |
| 4,947,175 | A |   | 8/1990 | Overhoiser | 342/165 |
| 4,972,193 | A | * | 11/1990 | Rice | 342/90 |
| 4,992,797 | A | * | 2/1991 | Gjessing et al. | 342/192 |
| 5,337,053 | A | * | 8/1994 | Dwyer | 342/90 |
| 5,392,050 | A | * | 2/1995 | Guerci et al. | 342/90 |
| 5,481,269 | A | * | 1/1996 | Imhoff et al. | 342/90 |
| 5,497,158 | A | * | 3/1996 | Schmid et al. | 342/90 |
| 5,504,487 | A | * | 4/1996 | Tucker | 342/90 |
| 5,534,873 | A |   | 7/1996 | Weichman et al. | 342/165 |
| 5,561,431 | A | * | 10/1996 | Peele et al. | 342/90 |
| 5,574,463 | A | * | 11/1996 | Shirai et al. | 342/90 |
| 5,612,700 | A | * | 3/1997 | Tucker | 342/90 |
| 5,757,309 | A | * | 5/1998 | Brooks et al. | 342/90 |
| 5,828,334 | A | * | 10/1998 | Deegan | 342/90 |
| 5,867,118 | A | * | 2/1999 | McCoy et al. | 342/90 |
| 6,222,481 | B1 | * | 4/2001 | Abrahamson et al. | 342/90 |
| 6,278,401 | B1 | * | 8/2001 | Wigren | 342/195 |
| 6,337,654 | B1 | * | 1/2002 | Richardson et al. | 342/90 |
| 6,396,433 | B1 | * | 5/2002 | Clodfelter | 342/89 |
| 6,411,251 | B2 | * | 6/2002 | Stanek et al. | 342/90 |
| 6,437,728 | B1 | * | 8/2002 | Richardson et al. | 342/90 |

* cited by examiner

*Primary Examiner*—Bernarr E. Gregory
(74) *Attorney, Agent, or Firm*—David Kalmbaugh (57) ABSTRACT

An improved radar signature evaluation apparatus for measuring and evaluating the radar signature for an aircraft, missiles, and other vehicle. The radar signature apparatus includes an instrumentation system for generating radar cross section data for the vehicle being evaluated and a computer for processing the radar cross section data and a printer for printing various plots derived from the radar cross section data.

24 Claims, 10 Drawing Sheets

RADAR SIGNATURE EVALUATION APPARATUS

BACKGROUND OF THE INVENTION

1. Field of the Invention

The present invention relates generally to the field of radar cross-section/radar signature measurements and, in particular, to an improved radar signature evaluation apparatus for measuring and evaluating the radar signature of an aircraft, missile, and the like.

2. Description of the Prior Art

The role of radar to perform all-weather surveillance, detection and tracking of potentially hostile aircraft, missiles or other airborne vehicle was established during the second World War. In response to the availability of highly sophisticated radar systems to hostile forces over the past two decades, survivability has become a critical aspect of all military vehicles. For example, stealth or low radar observable aircraft, such as the B-2 bomber and the F-117 fighter aircraft, were developed to evade the radar of forces hostile to the U.S. military.

Because the principal component of survivability is low radar-observability (L.O.), state of the art military systems involve complex designs, such as the delta shaped designs of the B-2 and F-117 aircraft, to provide for low radar signature. The development of low radar-observability aircraft and other vehicles requires efficient methods for testing, analyzing, interpreting and diagnosing the radar signature performance of these aircraft and other vehicles.

Radar signature, or radar reflectivity, of an aircraft or other vehicle describes how it will appear to an observing radar and thus, determines its detectability. Due to the coherent nature of radar signals, a radar signature is a complex quantity, highly dependent on the viewing aspect, radar frequency and polarization of an aircraft or other vehicle. For example, the characterization of a typical aircraft viewed over all aspect angles and all frequencies over conventional frequency bands would require in excess of 10 million independent data samples. The vast amount of information required to completely characterize the radar signature of a complex aircraft or other vehicle taxes both computational and experimental means of obtaining the required data. Although computational methods are convenient, the bulk of radar signature information is obtained by experimental methods on specialized RCS (radar cross section) measurement ranges. The need to collect the vast amount of required data experimentally has been the driving factor for the development of specialized, high-speed instrumentation systems for the collection. These systems provide the raw data that is subsequently processed, analyzed, and interpreted to define the radar signature of the aircraft or other vehicle.

Radar signature information collected in the past was typically presented by line plots showing the magnitude of the radar return as a function of viewing angle of the aircraft or other vehicle. These plots, known as RCS patterns, were easily interpreted by individuals familiar with their significance. The need for and availability of the vast data volumes necessary for the evaluation of the modern systems require that the information be presented by vastly more effective means. In order to analyze, interpret and diagnose potential problems in radar signatures, the individuals, such as the scientist and engineers, who analyze radar signatures need display methods or techniques for conveying the maximum amount of information in a very concise and clear format to avoid being overwhelmed by the information.

SUMMARY OF THE INVENTION

The present invention overcomes some of the difficulties of the past, including those mentioned above in that it comprises a highly effective radar signature evaluation apparatus for measuring and evaluating the radar signature of an aircraft, missile, and the like. An instrumentation system, which includes transmitting and receiving antennas as well as a frequency translator and an I/Q demodulator, provides the means for generating the radar cross section data to be processed by a central processing unit/digital computer.

The transmitting antenna transmits a pulse of RF (radio frequency) energy in the direction of the test vehicle. The receiving antenna receives the reflection of the pulse from the test vehicle and provides it to the frequency translator. The frequency translator compares the transmitted and received RF signals and provides an IF signal which represents the phase and the amplitude difference between the transmitted signal and the received signal. The I/Q demodulator extracts the I and Q components from the I/F signal, the I and Q components are converted to a digital format and then supplied to a sample and store circuit. The sample and store circuit samples the digitized I and Q components and then stores the digitized I and Q components for each sample of radar signature data. The digital samples of radar signature data are then provided to a central processing unit which processes the radar signature data.

The processed radar signature data which includes frequency and angular data is displayed by a variety of plots by a printer or a display connected to the central processing unit. The plots provide both spectral and spatial representations of the radar signature, the spectral representations relating to frequency dependence of a scattered radar signal and spatial representations relating to a spatial distribution of scattering features of the airborne or other type of vehicle under evaluation.

DETAILED DESCRIPTION OF A PREFERRED EMBODIMENT

Figure 1:
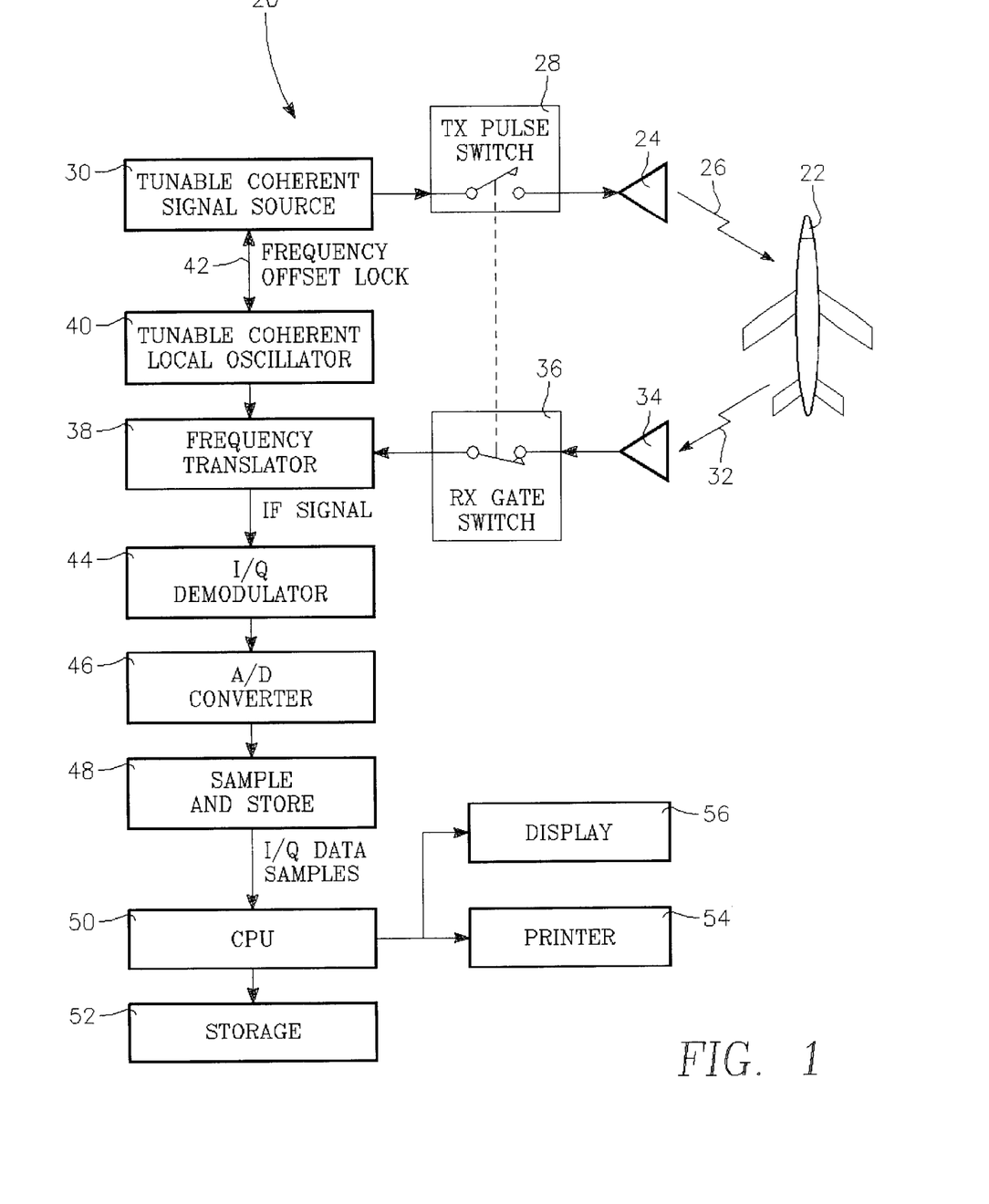
FIG. 1 is an schematic diagram of a instrumentation system which collects radar signature data of an aircraft or other vehicle for processing by a preferred embodiment of the present invention.

Referring to FIG. 1, there is shown a schematic diagram of an electrical apparatus/instrumentation system, designated generally by the reference numeral 20, which may be used to gather radar signature data or radar cross section data of an aircraft 22, missile or other vehicle. Apparatus 20 comprises a transmitting antenna 24 for transmitting an RF (radio frequency) signal 26 which includes pulses of microwave energy in the direction of the aircraft 22. Connected to antenna 24 is an RF pulse switch 28 which when closed sets the duration/pulse width of the pulses of microwave energy. A tunable coherent RF signal source 30 is connected to switch 28 and is the signal source for the RF energy transmitted by antenna 24, that is source 30 generates an electrical signal which is supplied through switch 28 to antenna 24.

An RF signal 32 is a reflection of the pulse of RF energy 26 transmitted to aircraft 22 by antenna 24. Signal 32 is received by a receiving antenna 34 which has an RF gate switch 36 connected to its signal output. The RF gate switch 36 is closed when switch 28 is open and open when switch 28 is closed. Closing switch 36 allows an electrical signal representative of RF signal 32 to pass through switch 36 to a frequency translator 38.

There is also connected to frequency translator 38 a tunable coherent local oscillator 40 which provides a reference signal to frequency translator 38. Frequency translator 38, which functions as a mixer, compares the RF signal 32 received at antenna 34 with RF signal 26 transmitted by antenna 24. Connecting signal source 30 to local oscillator 40 is a frequency offset lock line 42 which insures that oscillator 40 is synchronized with signal source 30. Frequency translator 38 provides at its output an IF (intermediate frequency) signal which represents the phase and the amplitude difference between the transmitted signal 26 and the received signal 32. The IF signal is a frequency-translated replica signal of the received signal.

The IF signal generated by frequency translator 38 is supplied to an I/Q demodulator 44 which extracts the I and the Q components from the analog IF signal. The output of I/Q demodulator 44 is connected to an analog to digital converter 46. The analog to digital converter 46 converts the I and Q components to a digital format prior to supplying the I and Q components to a sample and store circuit 48. The sample and store circuit 48 samples the digitized I and Q components and then stores the digitized I and Q components for each sample of radar. signature data. The digital samples of radar signature data are then provided to a central processing unit 50 which processes the radar signature data. Central processing unit 50 has a storage device 52 electrically connected thereto. Storage device 52 may be any commercially available memory, while central processing unit 50 may be a personal IBM compatible computer 50.

The central processing unit 50 has a color printer 54 and a display 56 connected thereto. The printer 54 prints the plots of FIGS. 3–11 in color allowing the user to evaluate the RCS data for the target 22. The display 56 which may be a color video monitor provides a means whereby the user of the present invention can visually observe the plots of FIGS. 3–11.

In the alternative, the I/Q demodulator 44 could be a digital device which would require that the input of analog to digital converter be connected to the output of frequency translator 38 and the output of the analog to digital converter be connected to the input of I/Q demodulator 44.

The data collection process for the radar signature of aircraft 22 begins with a calibration measurement of a calibration object whose radar cross section is theoretically known for each measured frequency. Examples of calibration objects are metallic cylinders, spheres, flat plates, and corner reflectors. The measured samples obtained from the calibration object are used to construct a calibration file by responses represented by the following expression.

calibration file=theoretical calibration response/measured response

Samples of the unknown target response, collected in a subsequent step, are multiplied with the calibration file to produce the calibrated RCS of an unknown object. Since the RCS is complex in nature, each sample must be represented by a magnitude, A, and a phase, θ. An equivalent representation of the samples consists of "real" and "imaginary" components, defined by the following expressions:

$$I = \text{Real} = A\cos(\theta)$$

$$Q = \text{Imaginary} = A\sin(\theta)$$

$$A^2 = \text{Real}^2 + \text{Imaginary}^2$$

$$\theta = \tan^{-1}(\text{Imaginary/Real})$$

Figure 2:
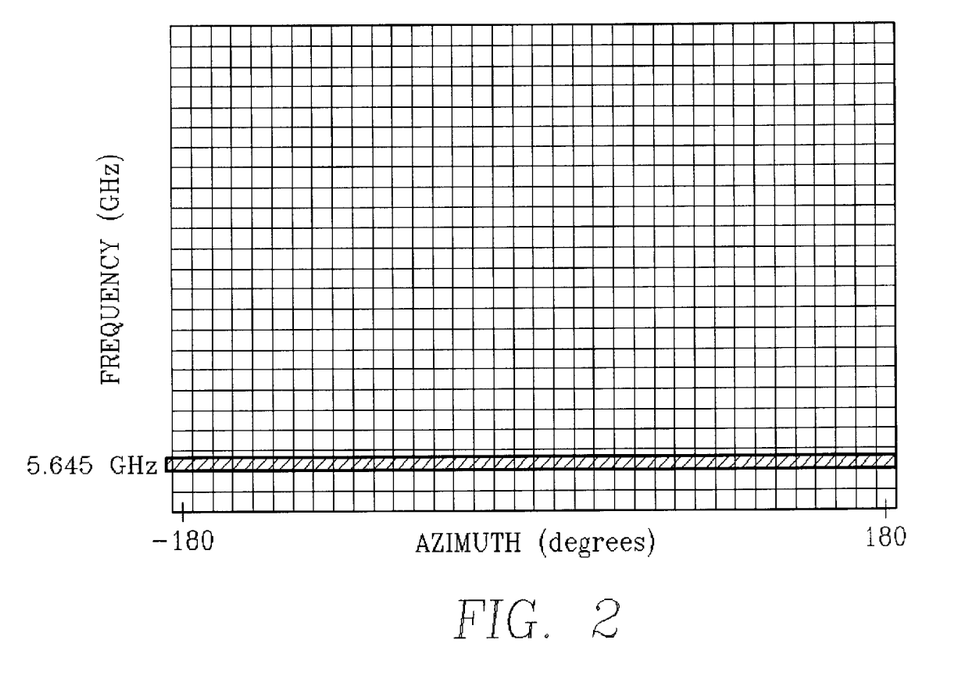
FIG. 2 illustrates a two dimensional array for a processed data file generated by the instrumentation system of FIG. 1.
Figure 3:
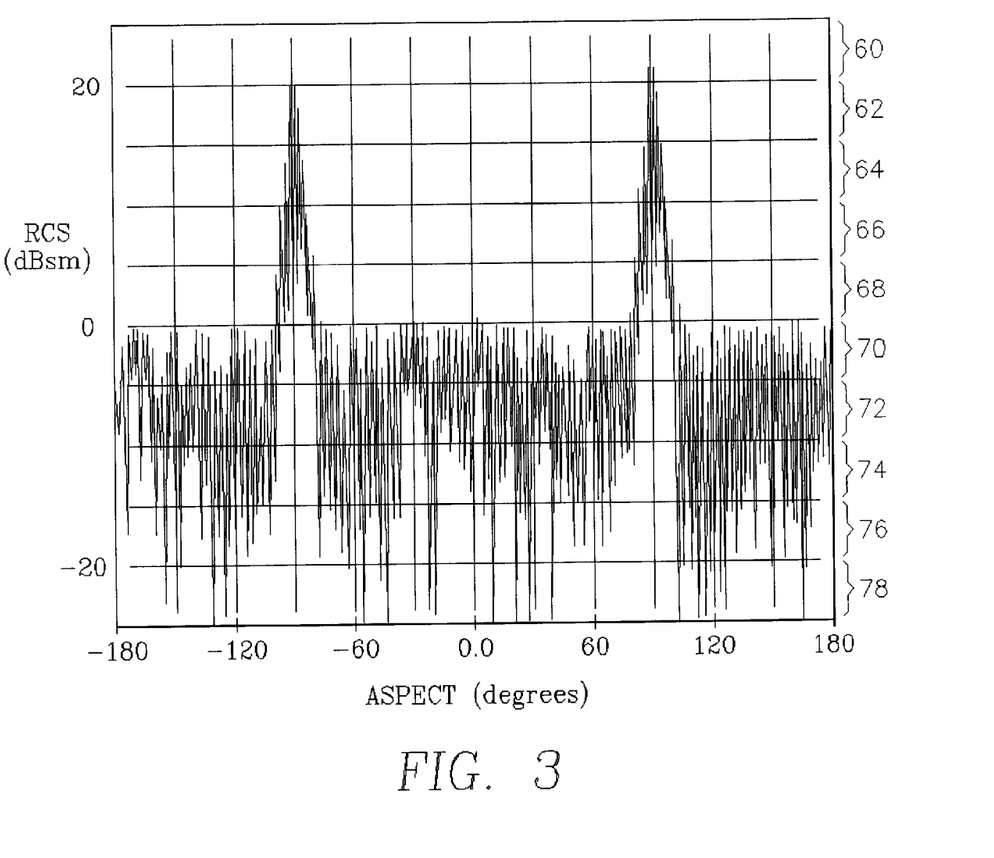
FIG. 3 is a color coded continuous wave plot generated from RCS data provided by the instrumentation system of FIG. 1.

Referring to FIGS. 1, 2 and 3, FIG. 2 depicts a symbolic representation of a complex radar cross section data array collected with the instrumentation system 20 and processed by the central processing unit 50 of FIG. 1. The frequency range is the vertical axis in GHz and the azimuth is the horizontal axis in degrees. The particular frequency being processed in FIG. 2 is 5.645 GHz over a range of ±180 degrees.

A continuous wave (CW) plot for the radar cross section of a BMQ-34S target at frequency of 5.645 GHz is depicted in FIG. 3. The CW plot of FIG. 3 is shown in rectangular form with RCS magnitude on the vertical axis and aspect angle on the horizontal axis. The plot is color coded with white 60 representing an RCS for the BMQ-34S target in a range of 20 to 25 dBsm (decibels relative to a square meter), magenta 62 representing an RCS for the target in the range of 15 to 20 dBsm, red 64 representing an RCS for the target in the range of 10 to 15 dBsm, orange 66 representing an RCS for the target in the range of 5 to 10 dBsm and yellow 68 representing an RCS for the target in the range of 0 to 5 dBsm. Similarly, green 70 represents an RCS for the BMQ-34S target in the range of 0 to −5 dBsm, light blue 72 represents an RCS for the target in the range of −5 to −10 dBsm, dark blue 74 represents an RCS for the target in the range of −10 to −15 dBsm, purple 76 represents an RCS for the target in the range of −15 to −20 dBsm and black 78 represents an RCS less than −20 dBsm.

Figure 4:
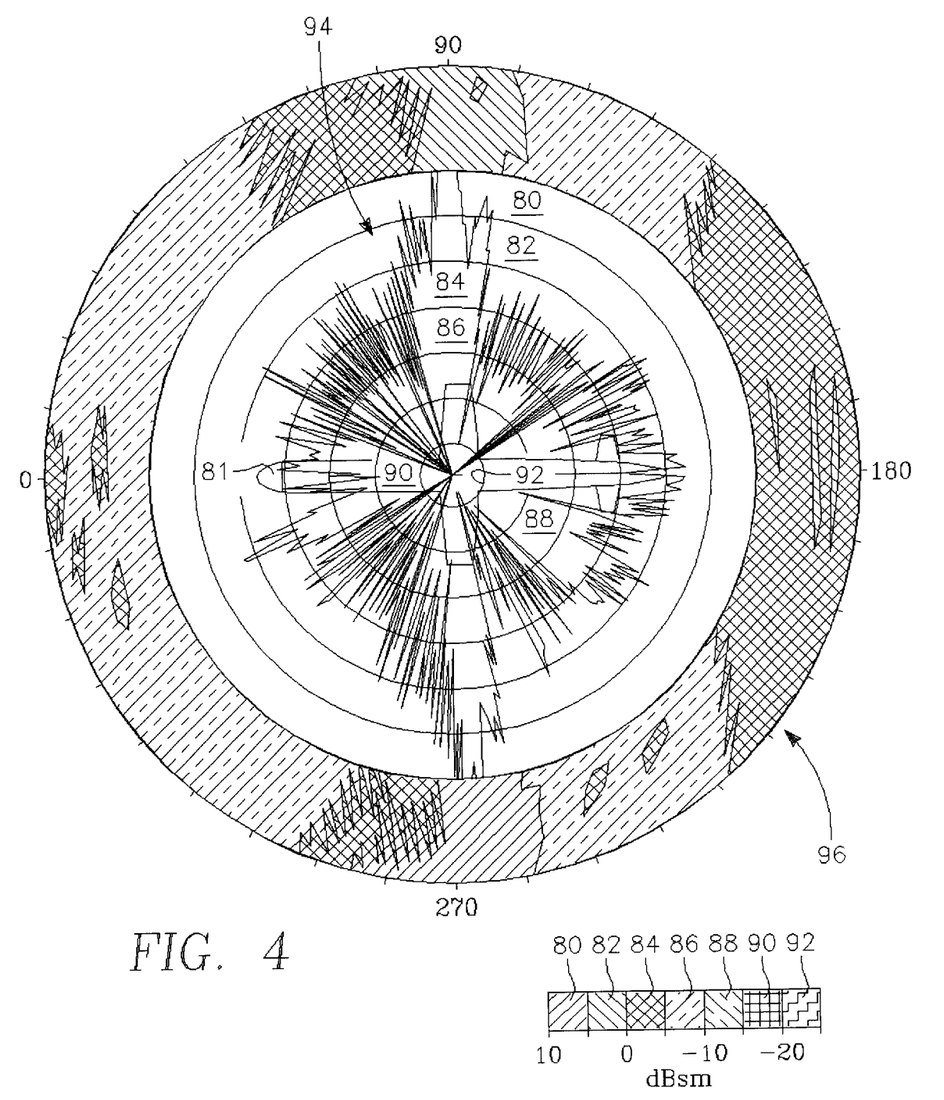
FIG. 4 is a color coded multiple frequency plot generated from RCS data provided by the instrumentation system of FIG. 1.

Referring to FIG. 4, an example of a Global RCS plot is shown in FIG. 4. FIG. 4 displays an entire data set of an RCS file for a BQM-74C target with frequency plotted on the radial axis, viewing angle on the angular coordinate, and the RCS magnitude of the target displayed in color.

In the plot of FIG. 4, magenta 80 represents an RCS magnitude for the BQM-74C target 81 in the range of 5 to 10 dBsm, red 82 represents an RCS magnitude for the target 81 in the range of 0 to 5 dBsm, yellow 84 represents an RCS magnitude for the target 81 in the range of 0 to −5 dBsm, green 86 represents an RCS magnitude for the target 81 in the range of −5 to −10 dBsm, blue 88 represents an RCS magnitude for the target 81 in the range of −10 to −15 dBsm, purple 90 represents an RCS magnitude for the target 81 in the range of −15 to −20 dBsm, and black 92 represents an RCS magnitude for the target 81 less than −20 dBsm. In FIG. 4, the inner plot, designated generally by the reference numeral 94 is polar version of the Cw plot with RCS magnitude shown on the radial axis and aspect angle shown on the angular axis. The frequency for plot 94 is 3.38 GHz. The polarization for the plot of FIG. 4 is VV (vertical transmit and vertical receive). The RCS data which comprises the outer color coded plot 96 is generated by the instrumentation system 20 over a frequency range of 2.42 GHz to 4.32 GHz and a viewing angle of 360 degrees.

Radar cross section data collected over a frequency band (2.42–4.32 GHZ for FIG. 4) for a target rotation of 360 degrees forms an annular shaped plot which can display millions of data samples in a highly compact form. Because the single display illustrated in FIG. 4 provides a global view of target response over a wide range of frequencies and angles, it prevents incorrect assessments of RCS behavior based on conventional single-frequency RCS patterns.

Plotting frequency data on the radial axis with 0 at the center constitutes a polar formatting, implemented by the following expression:

$$x=f\cos(\theta) \text{ and } y=f\sin(\theta)$$

where x and y are the horizontal and vertical coordinates of a sample corresponding to a specific frequency and angle.

Plotting data on this polar format results in responses caused by periodic interference between scatterers and grating-lobes to map as parallel straight lines. In addition, responses from specular scatterers such as flat surfaces map as stripes of uniform width. The distinct features resulting from the polar formatting facilitate the interpretation of the RCS data for the aircraft, target or other vehicle.

The global RCS plot may also be formatted in a three dimensional presentation with the amplitude shown in color and in height. This format also allows for tilting and rolling of the plot, which, in turn, allows for an examination of the data from different perspectives. The three dimensional rendering of a Global RCS plot is straight forward and may be accomplished using conventional plotting routines.

Figure 5:
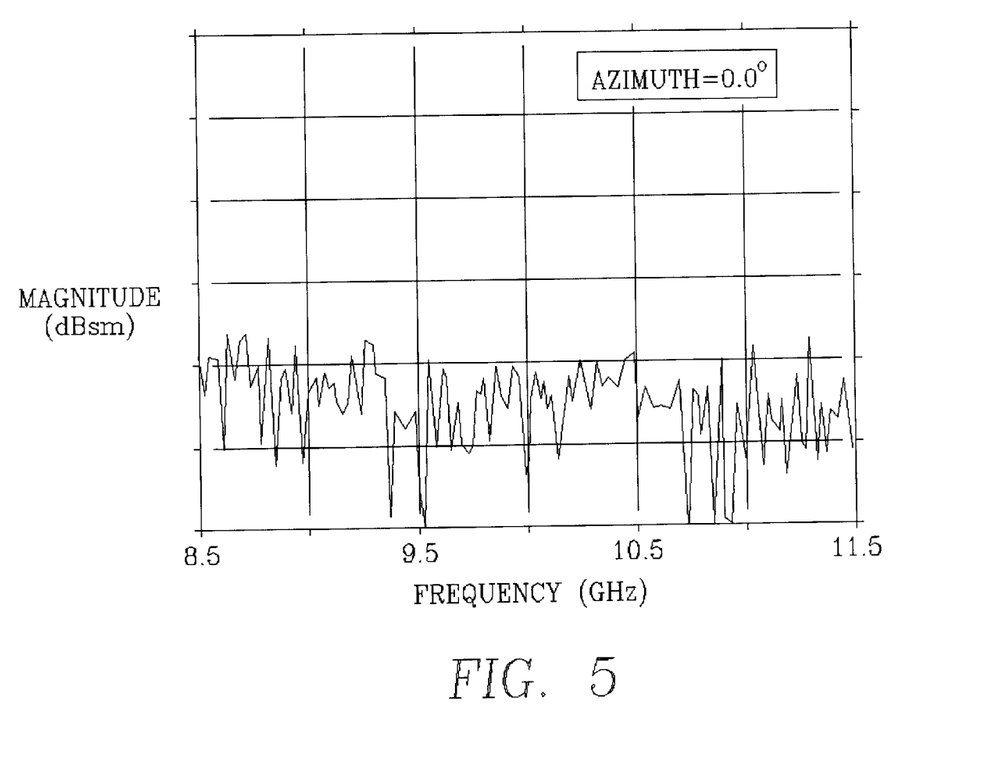
FIG. 5 is a frequency plot wherein magnitude versus frequency is plotted from RCS data provided by the instrumentation system of FIG. 1.

Referring to FIGS. 3 and 5, other spectral presentations can be derived from the RCS file of the type represented by FIG. 2. FIGS. 3 and 5 show examples of RCS versus frequency and RCS versus angle plots, FIG. 5 is for a specific viewing angle of 0 degrees, FIG. 3 is for a specific frequency of 5.65 GHz. Plotting the RCS magnitude versus frequency for a specific aspect angle produces the frequency response of the target which allows finer examination of RCS data for any radial cut through a Global RCS plot. Plotting the RCS magnitude versus aspect angle for a specific frequency allows closer evaluation of RCS data through an angular cut around a Global plot at a fixed radius. The RCS data versus angle plot of FIG. 3 is the format conventionally used to represent RCS data, known as the "RCS pattern".

Figure 6:
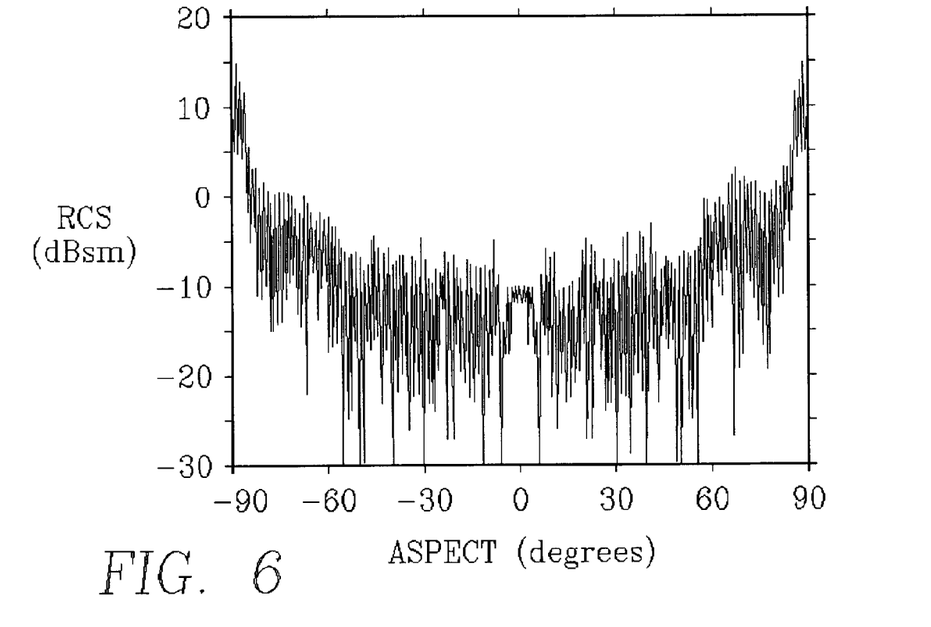
FIG. 6 is a radar cross section plot for a BQM-74C target with RCS data being provided by the instrumentation system of FIG. 1.
Figure 7:
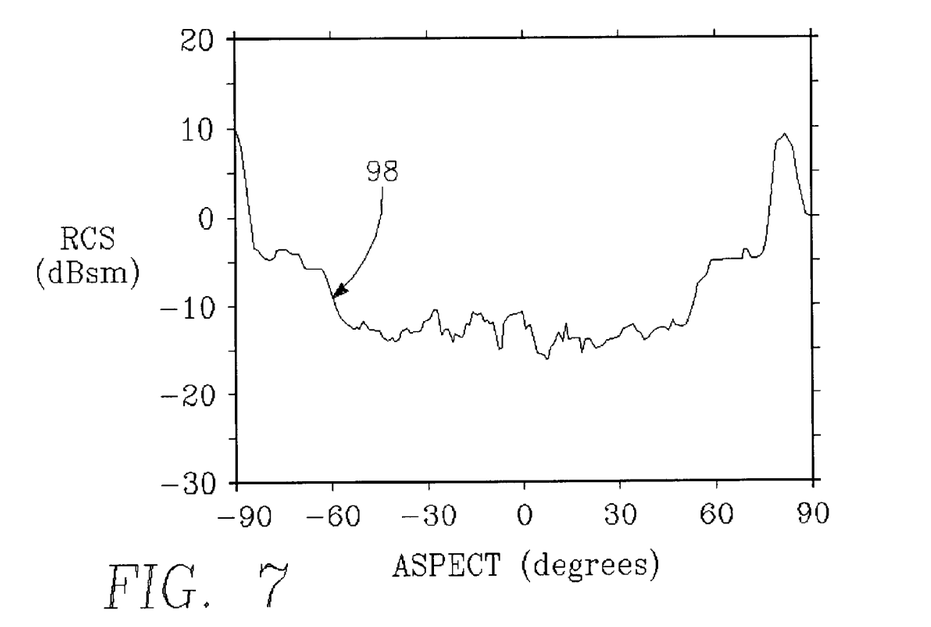
FIG. 7 is a medianized radar cross section plot for the RCS data of FIG. 6.

Referring to FIGS. 1, 6 and 7, RCS data responses for a single frequency exhibit large fluctuations due to the interference between signals received from multiple scatterers on the target as shown in FIG. 6. The RCS data is provided by I/Q demodulator 44. To show the general trend of the RCS magnitude version angle, the large fluctuations are smoothed (as shown in FIG. 7) by computing medians over successively stepped angular windows. The median is a statistical measure defined as the value exceeded by 50% of the RCS samples in an angular window. The medianized RCS plot 98 of FIG. 7 depicts the general magnitude of the target RCS and is useful for applications where the fine structure of the RCS data is not significant. Median values are typically determined over 10-degree angular sectors of the RCS pattern, repeated for successive 1-degree offsets. Because the smoothing process is performed by sliding over the RCS data, it is termed "Medianized RCS with a 10-degree window and 1-degree slide". The polarization for the plots of FIGS. 6 and 7 is VV (vertical transmit and vertical receive).

Referring to FIGS. 1, and 8A–8C, radar cross section applications may require data measured over a large range of viewing angles to be represented by a single value. This representation, typically required in acceptance testing of production aircraft, missiles and other vehicles having specified RCS performance characteristics, provides a quantitative threshold for pass/fail criteria. Because the acceptance criteria is of a global nature, the method for arriving at a single number representative of the vehicle signature is often times arbitrary. The averaging process used to derive a single value from a large range of data samples must be relatively insensitive to localized anomalies, yet sufficiently sensitive to detect failures. Although no single method can be established as optimal, the accepted process is set forth as follows.

Data from several RCS patterns spanning a specified angular region is analyzed. For example, RCS patterns for an azimuth angle ranging from −45 to +45 degrees and for elevation angles of −10, −5, 0, +5, +10 degrees may be considered. The starting frequency is 8.50 GHz and the ending frequency is 11.50 GHz and the pitch is 5.0 degrees. Median values are computed over a 10 degree window and a 1 degree slide for each of five RCS patterns, each of the five RCS patterns yielding approximately 90 values.

The cumulative probability distribution of 450 median values is determined and then plotted. Selected RCS values corresponding to specific percentile probabilities (such as 10, 50 and 90 percentiles) are used as indicators of the overall RCS.

Figure 8A:
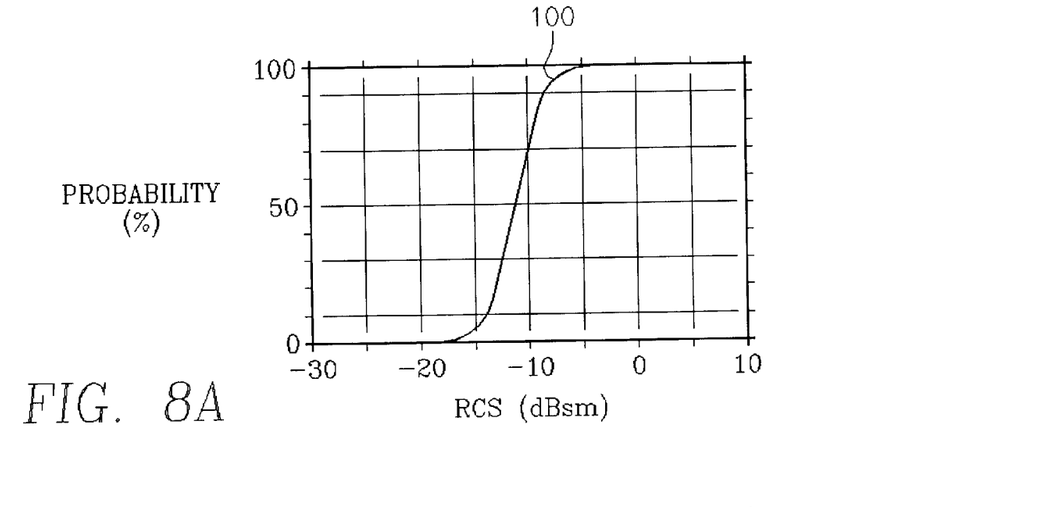
FIGS. 8A–8C illustrate cumulative probability plots for RCS data provided by the instrumentation system of FIG. 1.
Figure 8B:
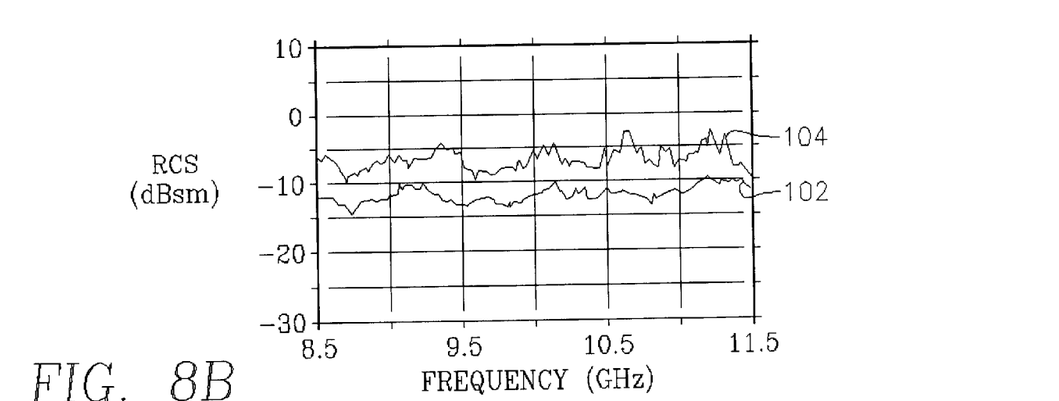
Figure 8C:
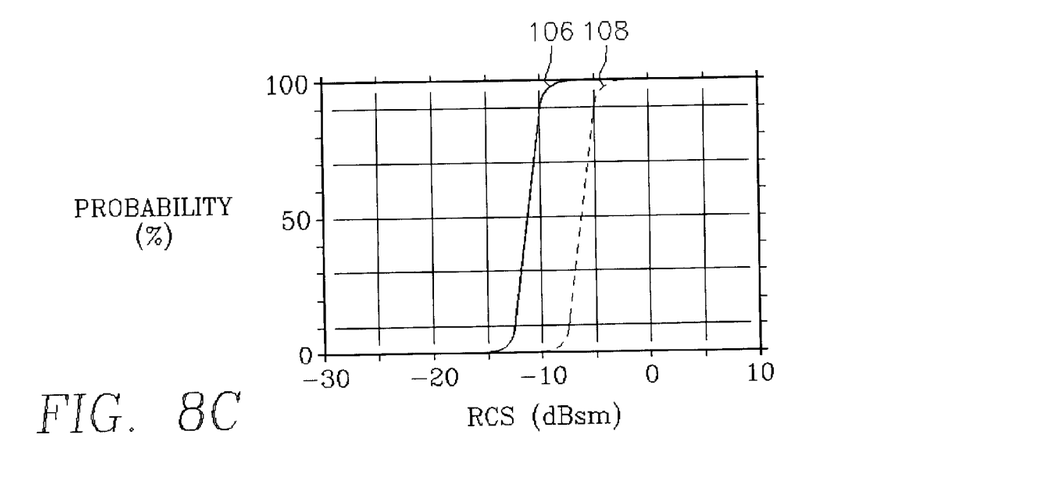

FIGS. 8A–8C depict an example of a percentile RCS plot obtained by this procedure. The cumulative probability plots use the same data displayed in the global RCS plots to statistically summarize variations in RCS data over all frequencies and rotation angle. The plot 100 of FIG. 8A is a cumulative distribution of all the RCS data samples over the angular sector −45 degrees to +45 degrees and the frequency limits 8.50 GHz to 11.5 GHz. The RCS patterns for each frequency are processed to compute the median RCS over a 10-degree window with a 1-degree slide. The median value 102 and peak value 104 of the computed medians are plotted as a function of frequency in FIG. 8B. The plot of FIG. 8C shows the cumulative distribution of the medians as indicated by reference numeral 106 and the peaks, as indicated by reference numeral 108 for all frequencies. FIGS. 8A, 8B and 8C provide an indication of the overall statistical RCS behavior of a target while retaining some measure of the variations in the RCS over frequency. The 85% median is −10.35 dBsm and the 85% maximum is −5.25 dBsm for the RCS data depicted in FIGS. 8A–8C.

Referring to FIGS. 1 and 2, utilization of the RCS information content to locate spatial positions of reflected signals 32 on target 22 is achieved by processing techniques that transform signals from the spectral domain to a spatial domain. The transform processes have minimum sampling requirements defined by Nyquist criteria in frequency and angle. The transform processes/methods make use of both the I and Q terms of a coherent RCS file which is illustrated in FIG. 2. While various transform algorithms may be used, the most common algorithm is the Fast Fourier Transform (FFT). The processes associated with the spatial domain consist of windowing functions, down range profiles, Global Range, cross range profiles, inverse synthetic aperture radar (ISAR) imaging, and image editing and filtering.

Figure 9:
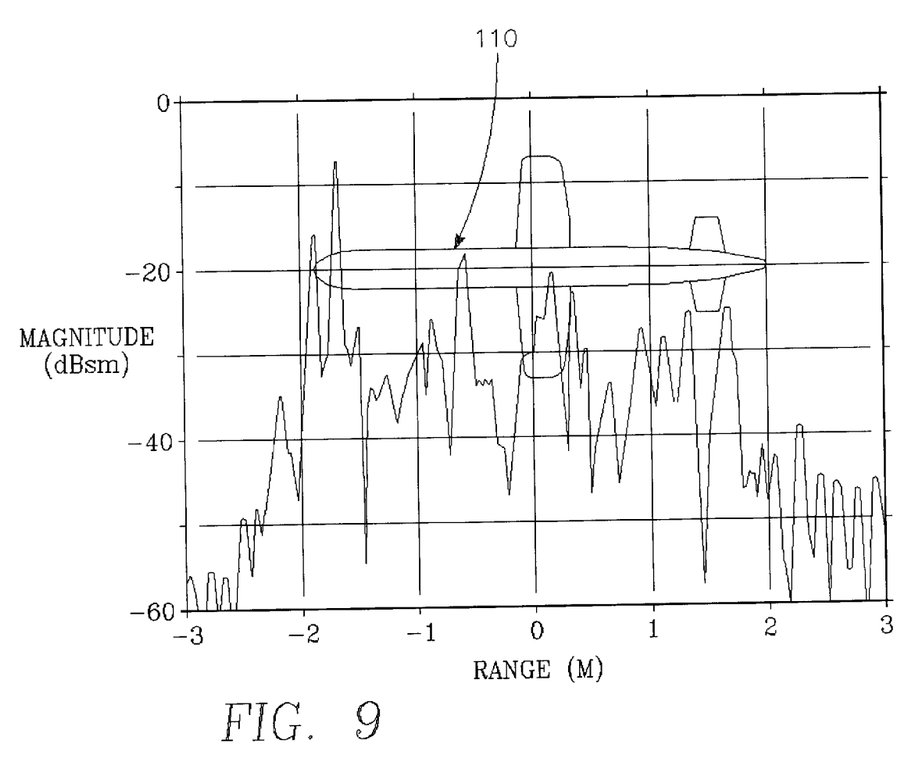
FIG. 9 illustrates a plot of a radar cross section range profile for a target with RCS data being provided by the instrumentation system of FIG. 1.

Referring to FIGS. 1, 2 and 9, spatial domain information is obtained by Fourier transform operations applied to spectral domain measured RCS data. Because the measured RCS data is of finite extent, either in frequency or angle, the resulting spatial products are subject to spurious sidelobe responses from spectral leakage caused by abrupt truncations in the available RCS data. The spectral leakage can be reduced by multiplying the spectral data by tapered window functions prior to the Fourier transform. The window functions adjust the RCS data by decreasing the data's amplitude toward the edges of the data block. In general, the spurious sidelobes decrease as the window functions and their derivatives become more continuous. Because this advantage is obtained at the cost of decreased resolution in the final spatial response, however, the selection of an optimal window constitutes a trade-off. The window function normally used for spatial imaging is the Hann window which consist of a $\cos^2(\cdot)$ function equal to unity at the center and tapering to zero at the edges of the RCS data block.

The RCS data in the two-dimensional array shown in FIG. 2 can be processed to obtain a radar cross section as a function of range by applying a Fast Fourier Transform to the contents of each column of FIG. 2 multiplied by a tapered window to suppress range side lobes. The plot of FIG. 9, which is an example of a range response for a fixed aspect angle, displays the radar cross section contained in a 10 cm range-resolution cell swept across a target 110 by a radar located at the left side of the plot of FIG. 9. An overlay of the target 110, shown on the plot, indicates the location of scattering sources that contribute to the reflected signal 32 and thus provides a useful diagnostic tool for identifying unique scattering mechanisms on targets of interest.

Figure 10:
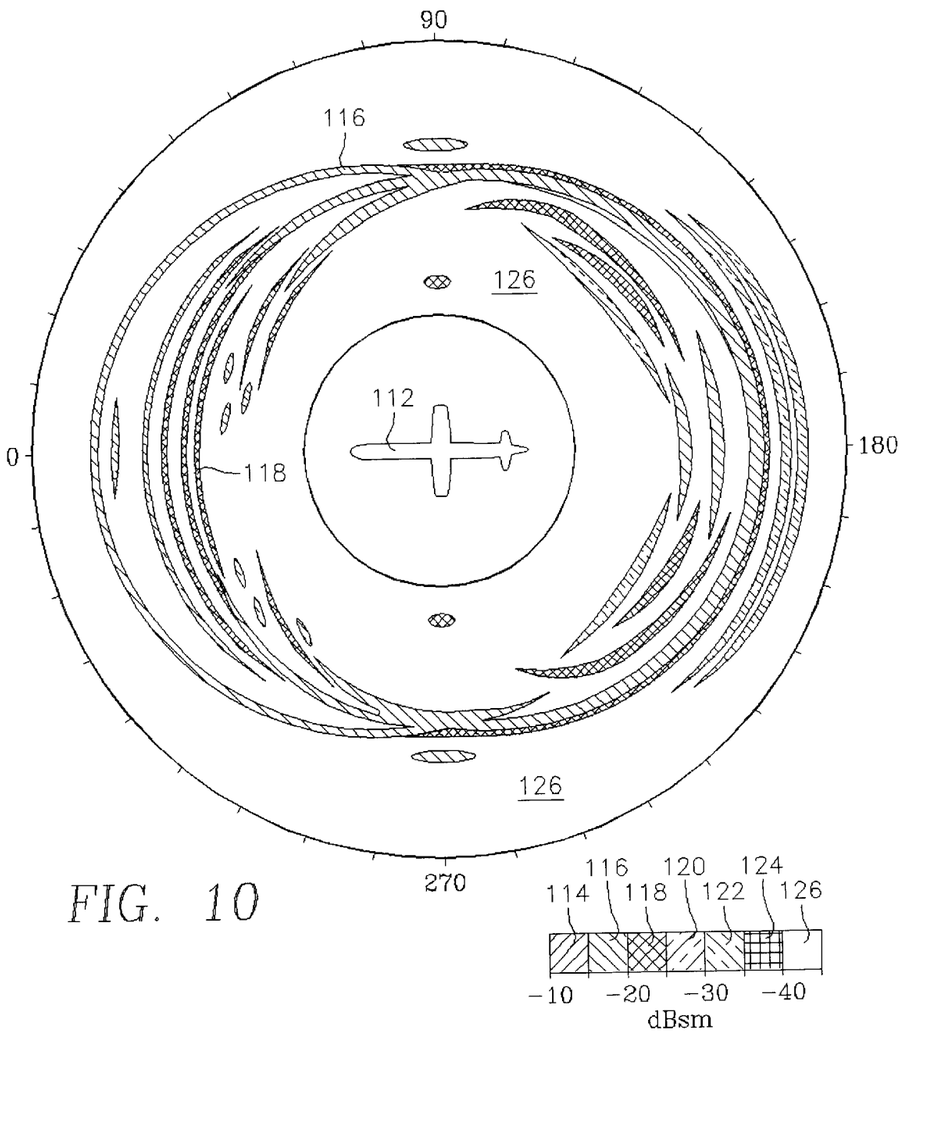
FIG. 10 illustrates a global range plot for a target with RCS data being provided by the instrumentation system of FIG. 1.

Referring to FIGS. 2, 9 and 10, the down-range plot of FIG. 9 illustrates the scattering distribution along the radar line-of-sight for a single viewing angle. By processing each column of the two-dimensional array shown in FIG. 2, a complete set of range profiles for a target 112, such as the BMQ-74C target, corresponding to each viewing angle can be provided in the manner illustrated in FIG. 10. The entire array of range profiles can be plotted in the polar display shown in FIG. 10. In the plot of FIG. 10, the color coding is as follows: magenta 114 represents an RCS magnitude for the BQM-74C target 112 in the range of −10 to −15 dBsm, red 116 represents an RCS magnitude for the target 112 in the range of −15 to −20 dBsm, yellow 118 represents an RCS magnitude for the target 112 in the range of −20 to −25 dBsm, green 120 represents an RCS magnitude for the target 112 in the range of −25 to −30 dBsm, blue 122 represents an RCS magnitude for the target 112 in the range of −30 to −35 dBsm, purple 124 represents an RCS magnitude for the target 112 in the range of −35 to −40 dBsm, and black 126 represents an RCS magnitude for the target 112 less than −40 dBsm.

The radar can be visualized to observe the target 112 located at the center of the plot of FIG. 10 from outside the annular region with the center annulus representing the range of the target center. In this format, each range profile is represented along a radial line with range increasing toward the center at the polar angle corresponding to the viewing angle. For the plot of FIG. 10, the center frequency is 10.05 GHz, the starting range is −3.0 meters and the ending range is 3.0 meters. Polarization for the plot of FIG. 10 is VV (vertical transmit and vertical receive).

Figure 11:
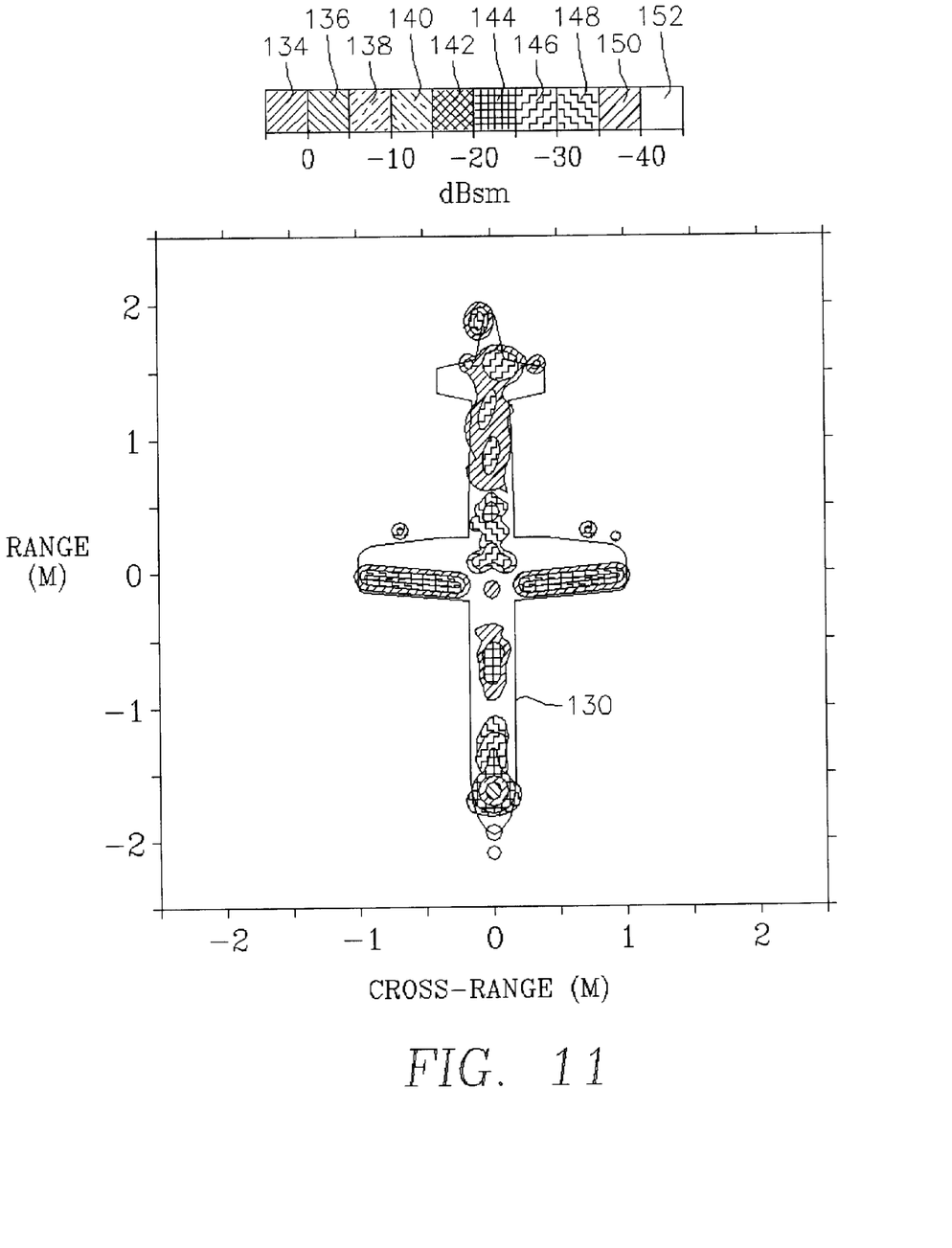
FIG. 11 illustrates a two dimensional radar cross section image for a target with RCS data being provided by the instrumentation system of FIG. 1.

Referring to FIGS. 2, 9 and 11, two-dimensional radar cross section images are obtained by processing a block of the RCS data array shown in FIG. 2 centered on angle of interest. The block of RCS data is processed by a two-dimensional Fast Fourier Transform after the data is: (1) weighted by a two-dimensional tapered window to suppress range and cross-range sidelobes; (2) reformatted in polar coordinates to perform a focusing correction; and (3) re-sampled to a rectangular grid to allow the use of the Fast Fourier Transform algorithm. The angle and frequency increments used to collect the data and form the image are selected to provide equal range and cross-range range resolution in the final image. The bandwidth determines the range resolution and the angular sector determines the cross-range resolution. X-band images typically use a bandwidth of 3.17 GHz and an angular sector of 18 degrees. The result of this process is a two-dimensional map of the spatial reflectivity distribution of the target. The coordinates of the map are down range and cross range in a direction normal to the axis of rotation. The data is plotted in a color coded format with an outline of the BQM-74E target 130 superimposed on the image as shown in FIG. 11 in which the radar can be visualized as located on the range axis, viewing the target 130 from the bottom of the plot. The RCS magnitudes in the plot are shown in 5 dB increments starting from the minimum level of −40 dBsm as indicated on color bar. The color coding for FIG. 11 is as follows: magenta 134 represents an RCS magnitude for the BQM-74E target 130 in the range of 5.0 to 0 dBsm, red 136 represents an RCS magnitude for the target 130 in the range of 0 to −5.0 dBsm, dark yellow 138 represents an RCS magnitude for the target 130 in the range of −05.0 to −10 dBsm, light yellow 140 represents an RCS magnitude for the target 130 in the range of −10 to −15 dBsm, green 142 represents an RCS magnitude for the target 130 in the range of −15 to −20 dBsm, blue 144 represents an RCS magnitude for the target 130 in the range of −20 to −25 dBsm, purple 146 represents an RCS magnitude for the target 130 in the range of −25 to −30 dBsm, turquoise 148 represents an RCS magnitude for the target 130 in the range of −30 to −35 dBsm, black 150 represents an RCS magnitude for the target 130 in the range of −35 to −40 dBsm and white 152 represents an RCS magnitude for the target 130 of less than −40 dBsm. The bandwidth for the plot of FIG. 11 is 2.411 GHz, the center frequency is 8.210 GHz and the pitch angle is 5.0 degrees. Polarization for the plot of FIG. 11 is VV (vertical transmit and vertical receive). The two dimensional images, shown with the target 130 overlay, greatly enhance the capability to assess the location of scattering mechanisms on complex targets.

While each plot illustrated in FIGS. 2–11 provides a unique analysis capability, the combination of plots enables a much more comprehensive assessment of RCS characteristics of any vehicle. The integration of the plots into a GUI (Graphical Interface Unit) environment further enhances the analysis capability. The user friendliness of the GUI approach, and specific interface features in the user window environment enable robust analysis. Within the GUI a hybrid of plots is possible allowing further flexibility in analysis. The hybrid plots use the GUI environment to connect analysis types such as graphical selection of frequency and angle from the Global RCS plot for parameter selection in producing the corresponding ISAR image or down range profile.

The GUI provides a rapid means to parametrically evaluate data with scroll bars that vary parameters such as: center frequency, bandwidth, and viewing angle. The GUI allows plots of the desired product at sufficient speed to emulate a "movie-like" presentation. This type of display provides a rapid qualitative assessment of the effects of various parameters, thus facilitating analysis and diagnostic functions.

An example of parametric analysis with GUI is the presentation of a two-dimensional image that varies with center frequency and bandwidth; the center frequency reveals how the distribution of scattering features varies with frequency and the bandwidth reveals the separation of scatterers as the range resolution increases. These variations are readily observed by the analyst by a simple movement of the scroll bar on the computer screen. Other parameters such as target pitch, roll, and yaw angles and radar polarization angle could be similarly used.

From the foregoing it may readily be seen that the present invention comprises a new, unique and exceedingly useful radar signature evaluation apparatus for measuring and evaluating the radar signature for an aircraft, missile, and the like which constitutes a considerable improvement over the known prior art. Obviously, many modifications of the present invention are possible in light of the above teachings. It is therefore to be understood that within the scope of the appended claims that the invention may be practiced otherwise than as specifically described.

What is claimed is:

1. An apparatus for determining a radar signature for a vehicle comprising:

transmitting means for transmitting an RF (radio frequency) signal at said vehicle, said RF signal having pulses of microwave energy;

receiving means for receiving reflections of said RF signal from said vehicle, said receiving means providing an electrical signal representative of the reflections of said RF signal;

signal generating means for generating a reference signal representative of RF signal transmitted by said transmitting means to said vehicle;

comparison means connected to said receiving means to receive said electrical signal and said signal generating means to receive said reference signal;

said comparison means comparing said electrical signal and said reference signal and then providing an intermediate frequency signal which represents a phase and an amplitude difference between said RF signal transmitted to said vehicle and the reflections of said RF signal from said vehicle;

demodulator means connected to said comparison means to receive said intermediate frequency signal, said demodulator means extracting I and Q components from said intermediate frequency signal, said I and Q components comprising amplitude and phase information for said radar signature of said vehicle;

converter means connected to said demodulator means to receive said I and Q components, said converter means converting said I and Q components from an analog format to a digital format;

processing means connected to converter means to receive said I and Q components;

said processing means processing said I and Q components to generate a radar cross section for said vehicle representing the radar signature for said vehicle, said radar cross section having a color coded format which approximates an intensity of the radar cross section for said vehicle at a plurality of locations on said vehicle;

display means connected to said processing means, said display means displaying the radar cross section in said color coded format to allow a user of said apparatus to observe said radar cross section for said vehicle in said color coded format.

2. The apparatus of claim 1 wherein the color coded format for said radar cross section has a range of 25 dBsm (decibels per square meter) to −20 dBsm.

3. The apparatus of claim 2 wherein the color coded format for said radar cross section includes a white representing a range of 20 to 25 dBsm, a magenta 62 representing a range of 15 to 20 dBsm, a red representing a range of 10 to 15 dBsm, an orange representing a range of 5 to 10 dBsm, a yellow representing a range of 0 to 5 dBsm, a green representing a range of −0 to −5 dBsm, a light blue representing a range of −5 to −10 dBsm, a dark blue representing a range of −10 to −15 dBsm, a purple representing a range of −15 to −20 dBsm and a black 78 representing less than −20 dBsm.

4. The apparatus of claim 1 further comprising a sample and store circuit having an input connected to converter means and an output connected to said processing means.

5. The apparatus of claim 1 wherein said processing means comprises a digital computer.

6. The apparatus of claim 1 wherein said display means comprises a color video monitor.

7. The apparatus of claim 1 wherein said display means comprises a color printer.

8. The apparatus claim 1 further comprising a memory connected to said processing means.

9. The apparatus of claim 1 wherein said comparison means comprises a frequency translator.

10. The apparatus of claim 1 wherein said signal generating means comprises a tunable coherent local oscillator connected to said comparison means, said tunable coherent local oscillator generating said reference signal received by said comparison means.

11. The apparatus of claim 1 further comprising:

a tunable coherent RF signal source having an output; and an RF pulse switch having a first terminal connected to the output of said tunable coherent RF signal source and a second terminal connected to said transmitting means.

12. An apparatus for determining a radar signature for a vehicle comprising:

a first antenna for transmitting an RF (radio frequency) signal at said vehicle, said RF signal having pulses of microwave energy;

a second antenna for receiving reflections of said RF signal from said vehicle, said second antenna providing an electrical signal representative of the reflections of said RF signal;

a frequency translator connected to said second antenna to receive said electrical signal, said frequency translator receiving a reference signal representative of said RF signal transmitted by said first antenna to said vehicle;

said frequency translator comparing said electrical signal and said reference signal and then providing an intermediate frequency signal which represents a phase and an amplitude difference between said RF signal transmitted to said vehicle and the reflections of said RF signal from said vehicle;

an I/Q demodulator connected to said frequency translator to receive said intermediate frequency signal, said I/Q demodulator extracting I and Q components from said intermediate frequency signal, said I and Q components comprising amplitude and phase information for said radar signature of said vehicle;

an analog to digital converter connected to said I/Q demodulator, said analog to digital converter converting said I and Q components from an analog format to a digital format;

a central processing unit connected to said analog to digital converter to receive said I and Q components;

a display connected to said central processing unit;

said central processing unit processing said I and Q components to generate a radar cross section for said vehicle representing the radar signature for said vehicle, said radar cross section having a color coded format which approximates an intensity of the radar cross section for said vehicle at a plurality of locations on said vehicle;

said display displaying the radar cross section in said color coded format to allow a user of said apparatus to observe said radar cross section for said vehicle in said color coded format.

13. The apparatus of claim 12 wherein the color coded format for said radar cross section has a range of 25 dBsm (decibels per square meter) to −20 dBsm.

14. The apparatus of claim 13 wherein the color coded format for said radar cross section includes a white representing a range of 20 to 25 dBsm, a magenta 62 representing a range of 15 to 20 dBsm, a red representing a range of 10 to 15 dBsm, an orange representing a range of 5 to 10 dBsm, a yellow representing a range of 0 to 5 dBsm, a green representing a range of −0 to −5 dBsm, a light blue representing a range of −5 to −10 dBsm, a dark blue representing a range of −10 to −15 dBsm, a purple representing a range of −15 to −20 dBsm and a black 78 representing less than −20 dBsm.

15. The apparatus of claim 12 further comprising a sample and store circuit having an input connected to said analog to digital converter and an output connected to said central processing unit.

16. The apparatus of claim 12 wherein said central processing unit comprises a digital computer.

17. The apparatus of claim 12 wherein said display comprises a color video monitor.

18. The apparatus of claim 12 wherein said display comprises a color printer.

19. The apparatus claim 12 further comprising a memory connected to said central processing unit.

20. The apparatus of claim 12 further comprising a tunable coherent local oscillator connected to said frequency translator, said tunable coherent local oscillator generating said reference signal received by said frequency translator.

21. The apparatus of claim 12 further comprising:

a tunable coherent RF signal source having an output; and an RF pulse switch having a first terminal connected to the output of said tunable coherent RF signal source and a second terminal connected to said first antenna.

22. An apparatus for determining a radar signature for a vehicle comprising:

a tunable coherent RF (radio frequency) signal source having an output;

an RF pulse switch having a first terminal connected to the output of said tunable coherent RF signal source and a second terminal;

a transmitting antenna connected to the second terminal of said RF pulse switch, said transmitting antenna transmitting an RF signal at said vehicle, said RF signal having pulses of microwave energy;

said tunable coherent RF signal source operating as an electrical RF signal source for said transmitting antenna, said RF pulse switch controlling a pulse width for the pulses of microwave energy in said RF signal;

a receiving antenna for receiving reflections of said RF signal from said vehicle, said receiving antenna providing an electrical signal representative of the reflections of said RF signal;

a tunable coherent local oscillator connected to said tunable coherent RF (radio frequency) signal source, said tunable coherent local oscillator generating a reference signal representative of said RF signal transmitted by said transmitting antenna to said vehicle;

a frequency translator connected to said receiving antenna to receive said electrical signal and said tunable coherent local oscillator to receive said reference signal;

said frequency translator comparing said electrical signal and said reference signal and then providing an intermediate frequency signal which represents a phase and an amplitude difference between said RF signal transmitted to said vehicle and the reflections of said RF signal from said vehicle;

an I/Q demodulator connected to said frequency translator to receive said intermediate frequency signal, said I/Q demodulator extracting I and Q components from said intermediate frequency signal, said I and Q components comprising amplitude and phase information for said radar signature of said vehicle;

an analog to digital converter connected to said I/Q demodulator, said analog to digital converter converting said I and Q components from an analog format to a digital format;

a central processing unit computer connected to said analog to digital converter to receive said I and Q components;

a color video monitor connected to said central processing unit;

said central processing unit processing said I and Q components to generate a radar cross section for said vehicle representing the radar signature for said vehicle, said radar cross section having a color coded format which approximates an intensity of the radar cross section for said vehicle at a plurality of locations on said vehicle; and said color video monitor displaying the radar cross section in said color coded format to allow a user of said apparatus to observe said radar cross section for said vehicle in said color coded format.

23. The apparatus of claim 22 wherein the color coded format for said radar cross section has a range of 25 dBsm (decibels per square meter) to −20 dBsm.

24. The apparatus of claim 22 wherein the color coded format for said radar cross section includes a white representing a range of 20 to 25 dBsm, a magenta 62 representing a range of 15 to 20 dBsm, a red representing a range of 10 to 15 dBsm, an orange representing a range of 5 to 10 dBsm, a yellow representing a range of 0 to 5 dBsm, a green representing a range of −0 to −5 dBsm, a light blue representing a range of −5 to −10 dBsm, a dark blue representing a range of −10 to −15 dBsm, a purple representing a range of −15 to −20 dBsm and a black 78 representing less than −20 dBsm.

* * * * *